United States Patent
Grubel et al.

(10) Patent No.: US 9,712,551 B2
(45) Date of Patent: Jul. 18, 2017

(54) METHODS AND SYSTEMS FOR ARCHITECTURE-CENTRIC THREAT MODELING, ANALYSIS AND VISUALIZATION

(71) Applicant: The Boeing Company, Seal Beach, CA (US)

(72) Inventors: Brian Christopher Grubel, Glen Burnie, MD (US); Dion Stephen David Reid, Grasonville, MD (US)

(73) Assignee: The Boeing Company, Chicago, IL (US)

( * ) Notice: Subject to any disclaimer, the term of this patent is extended or adjusted under 35 U.S.C. 154(b) by 267 days.

(21) Appl. No.: 13/690,517

(22) Filed: Nov. 30, 2012

(65) Prior Publication Data
US 2014/0157417 A1    Jun. 5, 2014

(51) Int. Cl.
*H04L 29/06* (2006.01)
*G06F 21/57* (2013.01)
*H04L 12/24* (2006.01)

(52) U.S. Cl.
CPC ........ *H04L 63/1433* (2013.01); *G06F 21/577* (2013.01); *H04L 41/145* (2013.01); *H04L 63/20* (2013.01); *H04L 41/22* (2013.01)

(58) Field of Classification Search
CPC ........ G08B 23/00; G06Q 30/02; H04L 63/20; H04L 63/1416; H04L 63/08; G06F 21/86
(Continued)

(56) References Cited

U.S. PATENT DOCUMENTS 7,013,395 B1    3/2006    Swiler
7,418,733 B2    8/2008    Connary et al.
(Continued)

FOREIGN PATENT DOCUMENTS

WO    2004/031953 A1    4/2004

OTHER PUBLICATIONS

Swiler, L.P., et al., "Computer-attack graph generation tool", DARPA Information Survivability Conference & Exposition II, 2001. DISC EX '01, Proceedings 12-14, IEEE vol. 2, Jun. 12, 2001, pp. 307-321.
(Continued)

*Primary Examiner* — John B King
(74) *Attorney, Agent, or Firm* — Armstrong Teasdale LLP

(57) ABSTRACT

Methods and systems for use in architecture-centric threat modeling are described. One example system includes a display device, a memory device for storing a plurality of attributes for each of a plurality of network objects, and a processor communicatively coupled to the memory device. The processor is programmed to receive a user selection of at least a first network object and a second network object from the plurality of network objects; create a network architecture including the first network object and the second network object; associate the stored plurality of attributes with the selected network objects in the network architecture; display, on the display device, a graphical representation of the created network architecture; receive, from the user, at least one dataflow attribute associated with at least one of the first and second network objects; and store the at least one dataflow attribute to said memory device as an attribute of at least one of the plurality of network objects.

17 Claims, 12 Drawing Sheets

(58) Field of Classification Search
USPC .............. 726/25, 22, 1; 713/188; 709/224
See application file for complete search history.

(56) References Cited

U.S. PATENT DOCUMENTS

| | | |
|---|---|---|
| 7,430,498 B2 | 9/2008 | Butterfield et al. |
| 7,979,247 B2 | 7/2011 | Butterfield et al. |
| 8,091,065 B2 | 1/2012 | Mir et al. |
| 8,307,444 B1 | 11/2012 | Mayer et al. |
| 8,312,549 B2 | 11/2012 | Goldberg et al. |
| 8,544,098 B2 * | 9/2013 | Gustave et al. ............. 726/25 |
| 2012/0089429 A1 | 4/2012 | Geddes et al. |
| 2012/0233698 A1 | 9/2012 | Watters et al. |

OTHER PUBLICATIONS

European Search Report issued in European Patent Application No. EP 13 19 3324, mailed Mar. 24, 2014.

\* cited by examiner

METHODS AND SYSTEMS FOR ARCHITECTURE-CENTRIC THREAT MODELING, ANALYSIS AND VISUALIZATION

BACKGROUND

The field of the disclosure relates generally to threat modeling, analysis, and visualization in networked environments, and more specifically, to architecture-centric threat modeling, analysis, and visualization.

Computer network security can include real-time or live, protection against computer and/or network threats, such as protection against a particular unauthorized access attempt, protection against computer viruses, worms, etc. Additionally, or alternatively, network security can include predictive security measures. Predictive security measures may be implemented before a particular threat is directed at a computer network. Predictive measures can use threat modeling and analysis to identify weak points in a network or system that may be vulnerable to attack. Security measures, whether hardware or software based, may be added to a system to decrease the risks associated with the identified vulnerabilities. In some situations, the network or system may also be changed to remove or limit the identified vulnerabilities.

Most known systems and methods for threat modeling, analysis, and/or visualization are software-centric and focus on identifying vulnerabilities in the software of a computer or network. Such solutions may be limited in scope, inefficient, and/or may be designed for software application assessment only. Known systems do not offer infrastructure or architecture-centric threat modeling that analyzes multiple layers of a network including network devices and other objects/processes through which data may flow. Moreover some known systems do not offer data re-use when creating multiple data flows, do not provide continuous monitoring, do not permit issue tracking, lack consistency, and provide limited reporting, visualization, and analysis. Accordingly, the use of known systems for threat modeling may provide only limited results.

BRIEF DESCRIPTION

In one aspect, a system for use in network architecture threat modeling includes a display device, a memory device for storing a plurality of attributes for each of a plurality of network objects, and a processor communicatively coupled to the memory device. The processor is programmed to: receive a user selection of at least a first network object and a second network object from the plurality of network objects; create a network architecture including and linking the first network object and the second network object; associate the stored plurality of attributes with the selected network objects in the network architecture; display, on the display device, a graphical representation of the created network architecture; receive, from the user, at least one dataflow attribute associated with at least one of the first and second network objects; and store the at least one dataflow attribute to said memory device as an attribute of at least one of the plurality of network objects.

In another aspect of the present disclosure, a method for use in network architecture threat modeling includes receiving, by a computing device, a user selection of at least a first network object and a second network object from a plurality of network objects stored in a memory device. A network architecture including the first network object and the second network object is created. A plurality of attributes of the selected network objects stored in the memory device are associated with the network architecture. The method also includes displaying, on a display device, a graphical representation of the created network architecture; receiving, from the user, at least one dataflow attribute associated with at least one of the first and second network objects; and storing the at least one dataflow attribute to said memory device as an attribute of at least one of the plurality of network objects.

Another aspect of the present disclosure is a computer readable medium having embodied thereon nontransitory computer executable instructions. When executed by a processor, the instructions cause the processor to: create a network architecture in response to a user input, the network architecture including at least a first network object and a second network object stored on a memory device; associate a stored plurality of attributes with the selected first and second network objects; display, on the display device, a graphical representation of the created network architecture; and store at least one dataflow attribute received from the user to the memory device as an attribute of at least one of the first and second network objects.

The features, functions, and advantages that have been discussed can be achieved independently in various embodiments or may be combined in yet other embodiments further details of which can be seen with reference to the following description and drawings.

DETAILED DESCRIPTION

Methods and systems for use in threat modeling, analysis, and visualization in networked environments are described herein. More specifically, the methods and systems described herein may be used in architecture-centric threat modeling, analysis, and visualization are described.

In exemplary implementations, methods and systems for performing efficient architecture-centric threat analysis on networked systems are disclosed. Various implementations provide the capability to document network architecture or leverage configuration controlled data, develop and compile object and link profile data, assign, identify, and track vulnerability data, automatically visualize complex data, create threat trees, utilize appropriate threat analysis methodologies for the system, and/or eliminate duplication. Exemplary implementations include a graphical architecture-centric threat modeling, analysis, and tracking method for networked systems within the design phase. Security may be incorporated when it is most cost-effective, i.e., when the network is being designed. Network decomposition into data flows focuses analysis down to the component level. Exemplary methods integrate data flows from a collection of manual inputs to dynamically visualize the overall architecture and display object vulnerability status. The capability exists to drag-and-drop new or existing objects to workspace during creation of data flows. Data flows may also be created by system level functions and features. The exemplary methods and systems may reduce costs and ensures consistency amongst analyses by sharing objects and associated attributes within a database. This allows the re-use of data, such that repetition is reduced, while the quality of the analysis is improved.

Data may be stored within a centralized database that is shared by all data flows and associated objects, links and findings. As such, multiple data and/or threat diagrams may be represented visually, as opposed to each flow being its own entity. Additionally, numerous reporting options are available that are currently not possible. Some implementations include a graphical interface for manual network, software, and logical element mapping integrated with data visualization algorithms for displaying security and threat analysis during upfront system architecture design and development. The exemplary methods and systems permit tracking of vulnerabilities when applied to multiple objects across multiple data flows concurrently for better tracking/resolution. This may allow a single point to update vulnerability information across all relevant data flows containing that assigned vulnerability.

Figure 1:
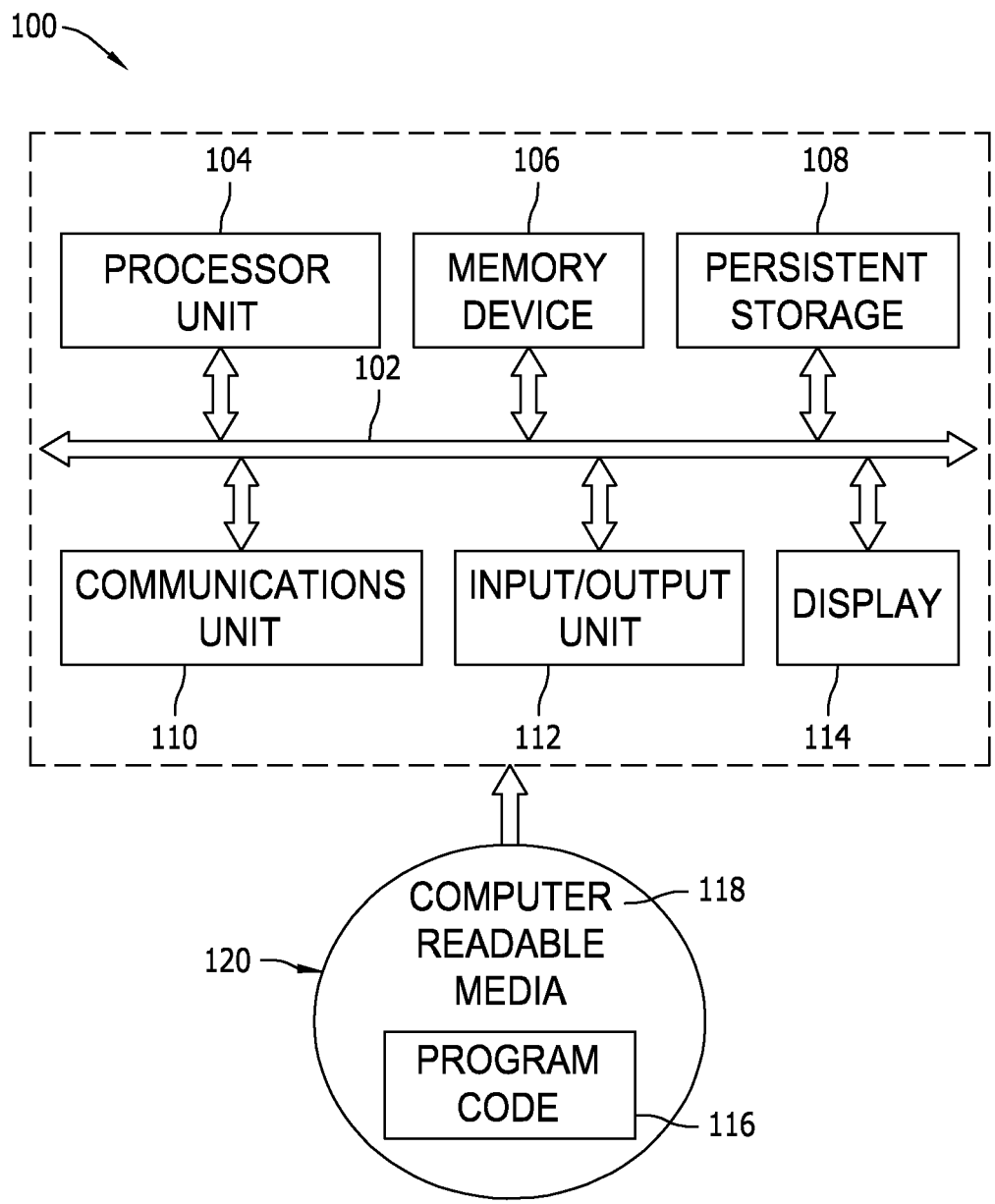
FIG. 1 is a block diagram of an exemplary computing device.

Exemplary implementations are performed using computing devices. FIG. 1 is a block diagram of an exemplary computing device 100 that may be used. In the exemplary implementation, computing device 100 includes communications fabric 102 that provides communications between a processor unit 104, a memory 106, persistent storage 108, a communications unit 110, an input/output (I/O) unit 112, and a presentation interface, such as a display 114. In addition to, or in alternative to, the presentation interface may include an audio device (not shown) and/or any device capable of conveying information to a user.

Processor unit 104 executes instructions for software that may be loaded into a storage device (e.g., memory 106). Processor unit 104 may be a set of one or more processors or may include multiple processor cores, depending on the particular implementation. Further, processor unit 104 may be implemented using one or more heterogeneous processor systems in which a main processor is present with secondary processors on a single chip. In another implementation, processor unit 104 may be a homogeneous processor system containing multiple processors of the same type.

Memory 106 and persistent storage 108 are examples of storage devices. As used herein, a storage device is any tangible piece of hardware that is capable of storing information either on a temporary basis and/or a permanent basis. Memory 106 may be, for example, without limitation, a random access memory and/or any other suitable volatile or non-volatile storage device. Persistent storage 108 may take various forms depending on the particular implementation, and persistent storage 108 may contain one or more components or devices. For example, persistent storage 108 may be a hard drive, a flash memory, a rewritable optical disk, a rewritable magnetic tape, and/or some combination of the above. The media used by persistent storage 108 also may be removable. For example, without limitation, a removable hard drive may be used for persistent storage 108.

A storage device, such as memory 106 and/or persistent storage 108, may be configured to store data for use with the processes described herein. For example, a storage device may store (e.g., have embodied thereon) computer-executable instructions, executable software components, network object descriptions and attributes, data flows, threat finding data, network templates, and/or any other information suitable for use with the methods described herein. When executed by a processor (e.g., processor unit 104), such computer-executable instructions and/or components cause the processor to perform one or more of the operations described herein.

Communications unit 110, in these examples, provides for communications with other computing devices or systems. In the exemplary implementation, communications unit 110 is a network interface card. Communications unit 110 may provide communications through the use of either or both physical and wireless communication links.

Input/output unit 112 enables input and output of data with other devices that may be connected to computing device 100. For example, without limitation, input/output unit 112 may provide a connection for user input through a user input device, such as a keyboard and/or a mouse. Further, input/output unit 112 may send output to a printer. Display 114 provides a mechanism to display information, such as any information described herein, to a user. For example, a presentation interface such as display 114 may display a graphical user interface, such as those described herein.

Instructions for the operating system and applications or programs are located on persistent storage 108. These instructions may be loaded into memory 106 for execution by processor unit 104. The processes of the different implementations may be performed by processor unit 104 using computer implemented instructions and/or computer-executable instructions, which may be located in a memory, such as memory 106. These instructions are referred to herein as program code (e.g., object code and/or source code) that may be read and executed by a processor in processor unit 104. The program code in the different implementations may be embodied in a non-transitory form on different physical or tangible computer-readable media, such as memory 106 or persistent storage 108.

Program code 116 is located in a functional form on non-transitory computer-readable media 118 that is selectively removable and may be loaded onto or transferred to computing device 100 for execution by processor unit 104. Program code 116 and computer-readable media 118 form computer program product 120 in these examples. In one example, computer-readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer-readable media 118 also may take the form of a persistent storage, such as a hard drive, a thumb drive, or a flash memory that is connected to computing device 100. The tangible form of computer-readable media 118 is also referred to as computer recordable storage media. In some instances, computer-readable media 118 may not be removable.

Alternatively, program code 116 may be transferred to computing device 100 from computer-readable media 118 through a communications link to communications unit 110 and/or through a connection to input/output unit 112. The communications link and/or the connection may be physical or wireless in the illustrative examples. The computer-readable media also may take the form of non-tangible media, such as communications links or wireless transmissions containing the program code.

In some illustrative implementations, program code 116 may be downloaded over a network to persistent storage 108 from another computing device or computer system for use within computing device 100. For instance, program code stored in a computer-readable storage medium in a server computing device may be downloaded over a network from the server to computing device 100. The computing device providing program code 116 may be a server computer, a workstation, a client computer, or some other device capable of storing and transmitting program code 116.

Program code 116 may be organized into computer-executable components that are functionally related. For example, program code 116 may include one or more part agents, ordering manager agents, supplier agents, and/or any component suitable for practicing the methods described herein. Each component may include computer-executable instructions that, when executed by processor unit 104, cause processor unit 104 to perform one or more of the operations described herein.

The different components illustrated herein for computing device 100 are not meant to provide architectural limitations to the manner in which different implementations may be implemented. The different illustrative implementations may be implemented in a computer system including components in addition to or in place of those illustrated for computing device 100. For example, other components shown in FIG. 1 can be varied from the illustrative examples shown.

As one example, a storage device in computing device 100 is any hardware apparatus that may store data. Memory 106, persistent storage 108 and computer-readable media 118 are examples of storage devices in a tangible form.

In another example, a bus system may be used to implement communications fabric 102 and may include one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 106 or a cache such as that found in an interface and memory controller hub that may be present in communications fabric 102.

Figure 2:
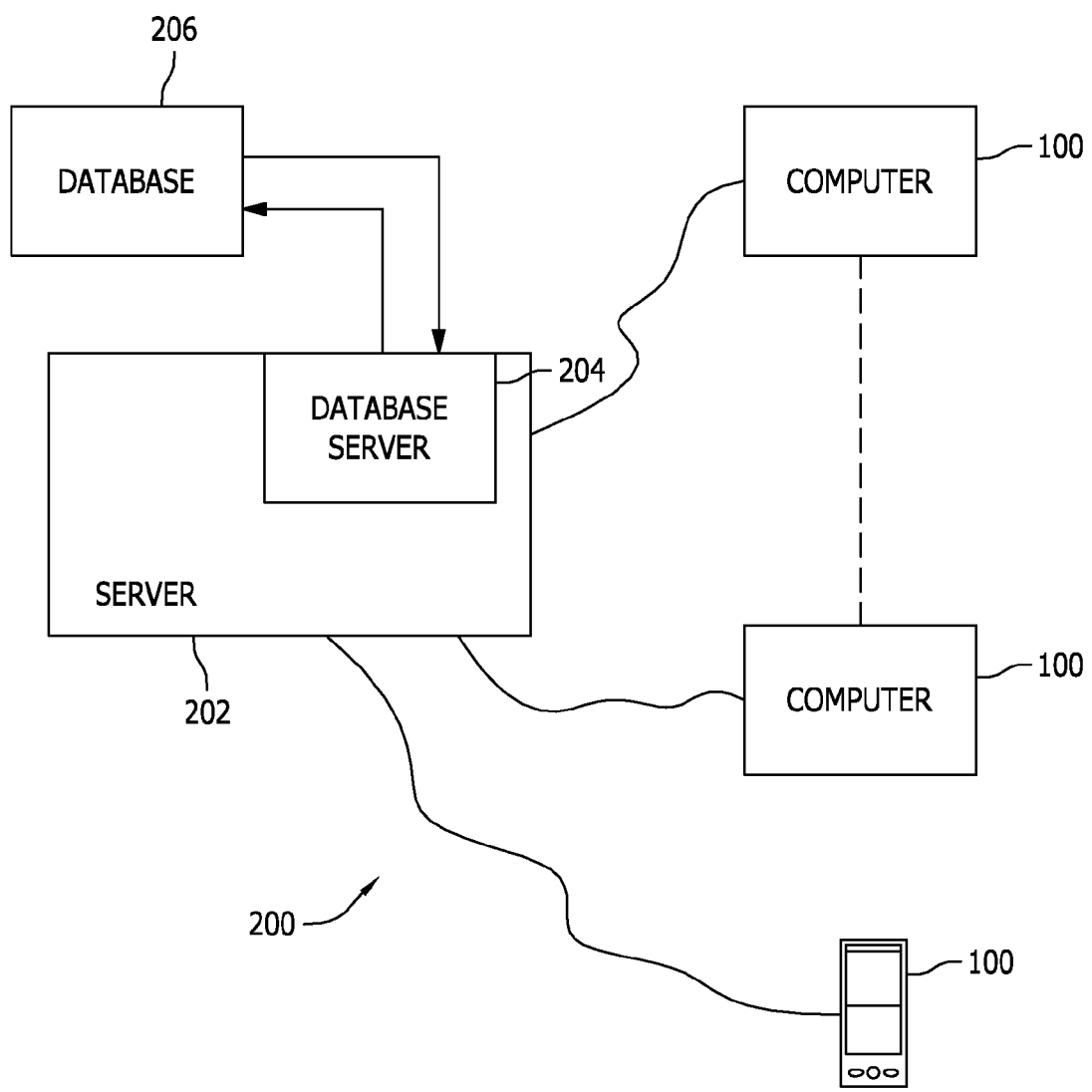
FIG. 2 is a block diagram of an exemplary network including the computing device shown in FIG. 1.

Some exemplary implementations are implemented using a network of computing devices. FIG. 2 is a simplified block diagram of an exemplary network 200 of computing devices 100.

More specifically, in the example implementation, system 200 includes a server system 202, which is a type of computer system, and a plurality of computing devices 100 connected to server system 202. In one implementation, server system 202 is accessible to computing devices 100 using the Internet. In other implementations, server system 202 may be accessible using any other suitable communication network, including, for example, a wide area network (WAN), a local area network (LAN), etc. Computing devices 100 may be interconnected to the Internet through many interfaces including a network, such as a local area network (LAN) or a wide area network (WAN), dial-in-connections, cable modems, and special high-speed ISDN lines. Computing devices 100 may be any device capable of interconnecting to the Internet including a web-based phone, personal digital assistant (PDA), or other web-based connectable equipment.

A database server 204 is connected to database 206, which contains information on a variety of matters, as described below in greater detail. In one implementation, centralized database 206 is stored on server system 202 and can be accessed by logging onto server system 202 through one of computing devices 100. In an alternative implementation, database 206 is stored remotely from server system 202 and may be non-centralized. Moreover, in some embodiments, database 206 and database server 204 utilize role-based authentication.

Figure 3:
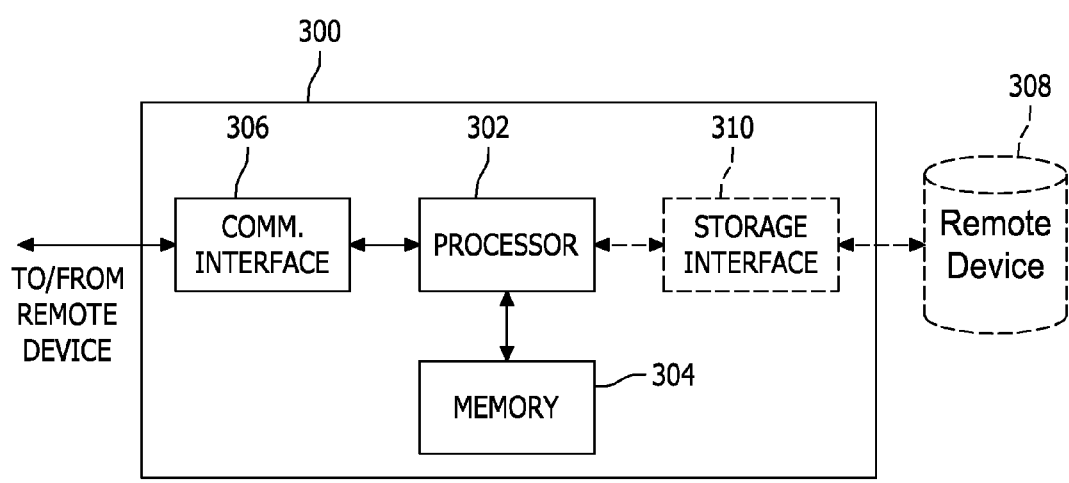
FIG. 3 is an exemplary configuration of a server computer device.

FIG. 3 illustrates an exemplary configuration of a server computer device 300 such as server system 202 (shown in FIG. 2). Server computer device 300 may include, but is not limited to, database server 204. Server computer device 300 includes a processor 302 for executing instructions. Instructions may be stored in a memory area 304, for example. Processor 302 may include one or more processing units (e.g., in a multi-core configuration). Memory area 304 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Processor 302 is operatively coupled to a communication interface 306 such that server computer device 300 is capable of communicating with a remote device such as computing device 100 or another server computer device 300. For example, communication interface 306 may receive requests from computing devices 100 via the Internet.

Processor 302 may also be operatively coupled to a storage device 308. Storage device 308 is any computer-operated hardware suitable for storing and/or retrieving data. In some implementations, storage device 308 is integrated in server computer device 300. For example, server computer device 300 may include one or more hard disk drives as storage device 308. In other implementations, storage device 308 is external to server computer device 300 and may be accessed by a plurality of server computer devices 300. For example, storage device 308 may include multiple storage units such as hard disks or solid state disks in a redundant array of inexpensive disks (RAID) configuration. Storage device 308 may include a storage area network (SAN) and/or a network attached storage (NAS) system.

In some implementations, processor 300 is operatively coupled to storage device 308 via a storage interface 310. Storage interface 310 is any component capable of providing processor 300 with access to storage device 308. Storage interface 310 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 300 with access to storage device 308.

An example system for use in network architecture threat modeling may be implemented using computing device 100 in network 200. The system includes display device 114, a memory device for storing a plurality of attributes for each of a plurality of network objects, and processor 104 communicatively coupled to the memory device. In some implementations, the memory device is persistent storage 108. In other implementations, the memory device is memory device 304 or 308. Database 206 stores the plurality of attributes of each of the plurality of network objects. Network objects are specific nodes within a data flow. The objects include physical components, processes, external interactors, data stores, etc.

Processor 104 is configured, such as by executable code stored in persistent storage 108, to receive a user selection of at least a first network object and a second network object from the plurality of network objects. The user inputs the selections using input output unit 112. The network objects available to user are displayed to user on display device 114, such as via a graphical user interface (GUI). Processor 104 creates a network architecture including the first network object and the second network object. In some implementations, the user selects individual objects and uses the selected objects to create the network architecture. In other implementations, the user selects a template of a network architecture stored in the memory device. The template includes at least two network objects. The user may expand a network architecture from a template by selecting additional objects or templates to add to the network architecture. Moreover, the user may store a created network as a custom template. In some embodiments, templates, including custom templates, may be shared among users.

In this implementation, processor 104 is configured to associate the stored plurality of attributes of the objects with the selected network objects in the network architecture. Thus, the created network architecture includes the attributes retrieved from the database 206 for each network object. Attribute for the network objects can include any data related to the objects, how the objects function, known weaknesses of the objects, etc. In various implementations for example, attribute data includes the name of the object, an icon or other graphical representation of the object, a part number of the object, an indicator of whether the object is hardware, software, or logical, networks or systems in which the object is or may be used, templates and network architectures that include the object, known threats/weaknesses of the object, protocols used by the object, the objects physical connections (inputs, outputs, etc.), the objects dataflow connections, manufacturer of the object, etc. A data flow is a collection of links that defines the communication for completing a particular function. Links are the connections of any two objects.

Processor 104 displays, on display device 114, a graphical representation of the created network architecture. Various types of graphical representations of the created network architecture may be displayed. FIGS. 4-13 are simplified illustrations of several types of graphical representations that may be displayed in the exemplary implementation. In other implementations different graphical representations and/or more or fewer of the illustrated representations may be available. FIGS. 4-13 include objects 400 and actors 500.

Figure 4:
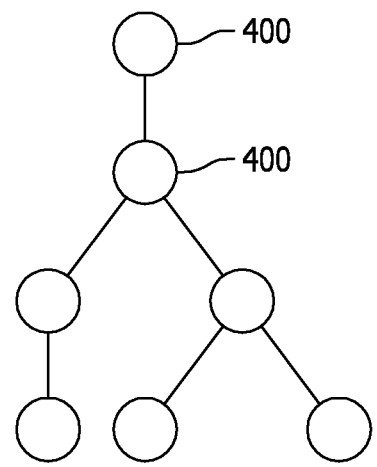
FIG. 4 is an illustration of an exemplary object hierarchy display.
Figure 5:
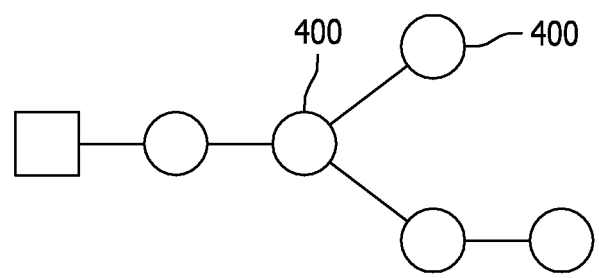
FIG. 5 is an illustration of an exemplary data flow diagram display.
Figure 6:
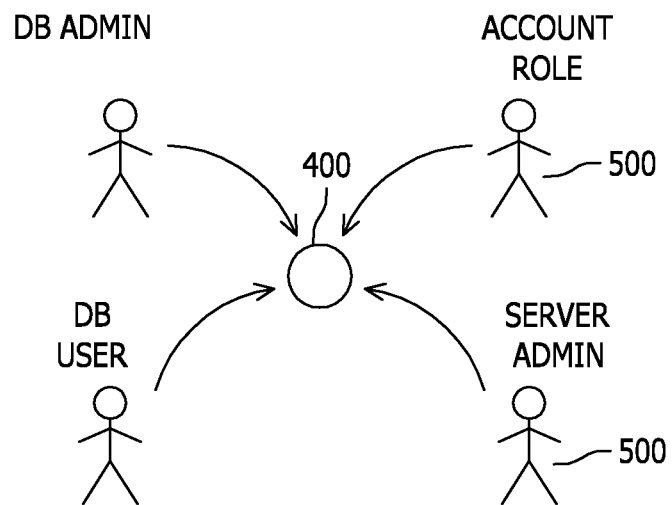
FIG. 6 is an illustration of an exemplary actor diagram display.
Figure 7:
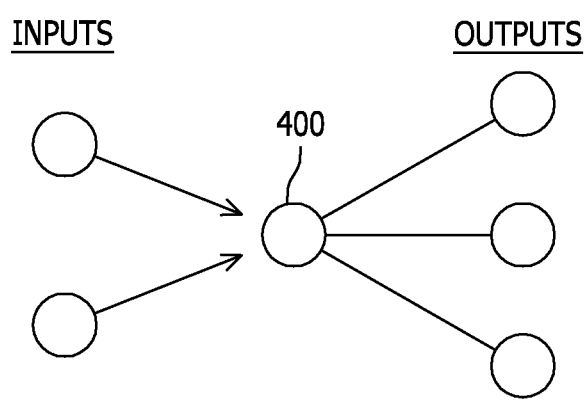
FIG. 7 is an illustration of an object only connection diagram.
Figure 8:
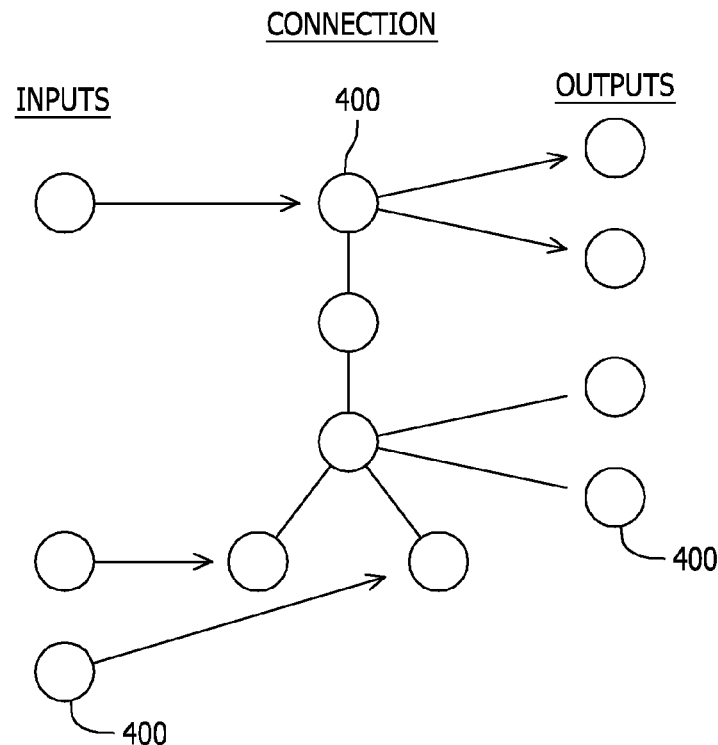
FIG. 8 is an illustration of a full hierarchy object connection display.
Figure 9:
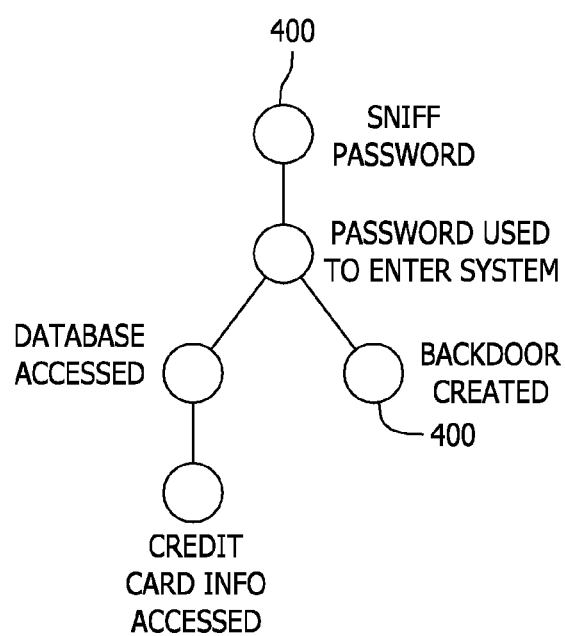
FIG. 9 is an illustration of a threat tree display.
Figure 10:
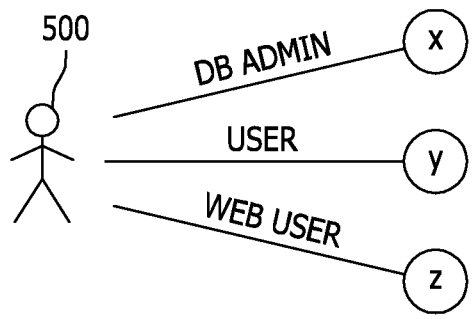
FIG. 10 is an illustration of an actor diagram display that displays by actor.
Figure 11:
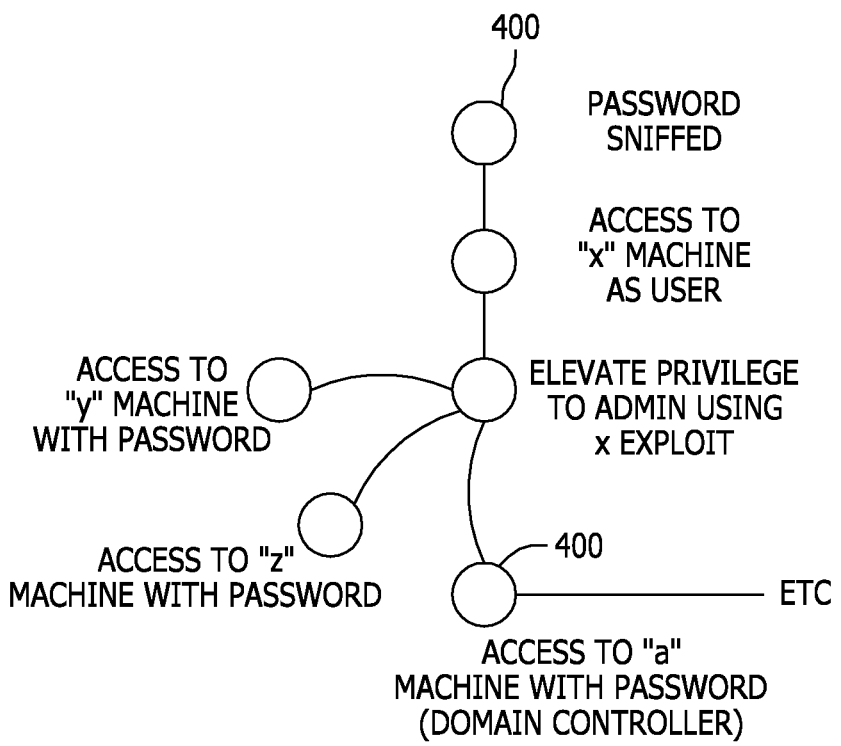
FIG. 11 is an illustration of a threat walking display.
Figure 12:
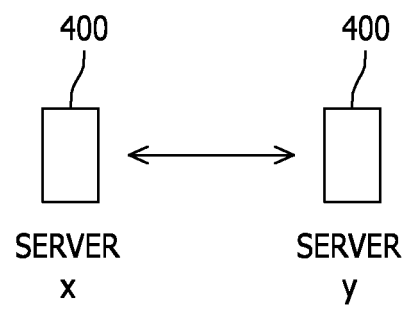
FIG. 12 is an illustration of a physical diagram.
Figure 13:
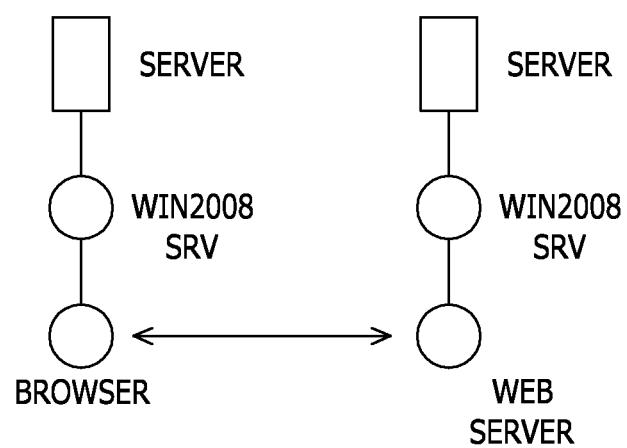
FIG. 13 is an illustration of a hierarchical connection diagram.
Figure 14:
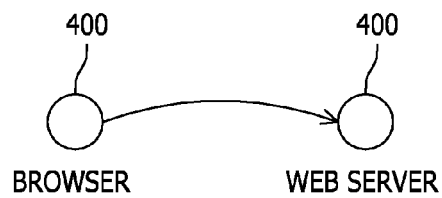
FIG. 14 is an illustration of a logical connection diagram.

FIG. 4 is an exemplary object hierarchy display. FIG. 5 is an exemplary data flow diagram display. FIG. 6 is an exemplary actor diagram display that shows actors on a single object of the network. FIG. 7 is an object only connection diagram. FIG. 8 is a full hierarchy object connection display. FIG. 9 is a threat tree display. FIG. 10 is an actor diagram display that displays by actor (rather than object). FIG. 11 is a threat walking display. The threat walking display shows a path through the created network architecture that an actor could take if the actor gained unauthorized access to the network through a particular object. In some implementations, the threat walking display also indicates additional attacks/weaknesses (e.g., additional passwords that would be needed, etc.) that would need to be exploited by the actor to continue along the path. Moreover, in some embodiments, the system is operable to implement scoring algorithms to predict the path of least resistance through the network and also show which layers an attacker could have access to at each vulnerability exploitation. FIG. 12 is a physical diagram. The physical diagram shows actual hardware connections without regard to logical connections. FIG. 13 is a hierarchical connection diagram. FIG. 14 is a logical connection diagram showing the logical connections without regard to the physical connections.

In some embodiments, the system permits two or more dataflows to be overlaid on top of each other for an overall view. A new data flow may be created from the combine data flows by selecting specific objects from the combined data flow image to create a new one. From this new flow, the user can add additional objects, if desired, and save the new flow.

After the network architecture is created, the network may be analyzed to identify potential threats and weaknesses. In some implementations, the exemplary system is configured to perform the analysis. For example, in some implementations, the system itself performs threat analysis as the network architecture is being created or after it has been created. In other implementations, the system may use one or more other systems or programs to perform the analysis. In still other implementations, the user performs the analysis, either directly or using one or more other systems or programs. For example, processor 104 may receive from the user, at least one threat finding associated with at least a portion of the network architecture. The processor 104 may further store the threat finding associated with the portion of the network architecture. The results of the threat analysis are referred to as findings. Moreover, existing analysis files can be used to aid in the analysis process. These analysis files contain input from previous analyses with recommendations. The user may run these rules to generate a report with recommendations or have the information available as a reference while performing the analysis. The various findings for a particular network object may be associated with the network object and stored to database 206 as an attribute of the associated network object. Thus, in the exemplary implementation, processor 104 receives, from the user, at least one dataflow attribute associated with at least one of the network objects of the created network architecture and stores the dataflow attribute to the memory as an attribute of the network objects stored in the memory.

As the exemplary system is used and attributes are updated with new findings, the system becomes more robust. When a second user creates a network architecture, the findings identified by the previous user(s) are automatically applied to the appropriate object(s). Thus, the second user does not necessarily need to repeat the threat analysis performed by the first user(s) and/or may perform a different threat analysis. Moreover, in various implementations, the system is continuously updated. When, for example a second user stores new findings associated with network objects, the updated attributes are applied to existing network architectures, such as those created by the first user. Additionally, the system ensures that two users do not overwrite each other's work. In the event that a conflict occurs, the system provides a conflict handling to resolve the conflict.

After a user has created a network architecture, the created architecture may be saved to database 206 as a particular network architecture and/or as a template. These templates may be used to create new network architectures. Moreover, the templates may be used to supplement other templates or network architectures. Additionally, as described above, the attributes of the network objects are continuously updated and, accordingly, the templates are continuously updated to include the latest attributes for the objects contained in the template architecture.

An exemplary method of security analysis according to the present disclosure identifies threats and their associated risks. Security analysts along with segment subject matter experts (SMEs) capture the preliminary network architecture. As described herein, the network design may take place using the system or the architecture may be imported in. After the network architecture is defined, in whole or in part, by a collection of data flow diagrams, security analysts assess each node and link of each flow for vulnerabilities. These findings are assigned to objects or links and can be available to other analysts working other aspects of the project. In some embodiments, the analysts use security assessment checklists developed from a suitable security assessment model. Flows are connected to threats through a security review process that identifies threats through object and protocol research and maps them to network elements.

Figure 15:
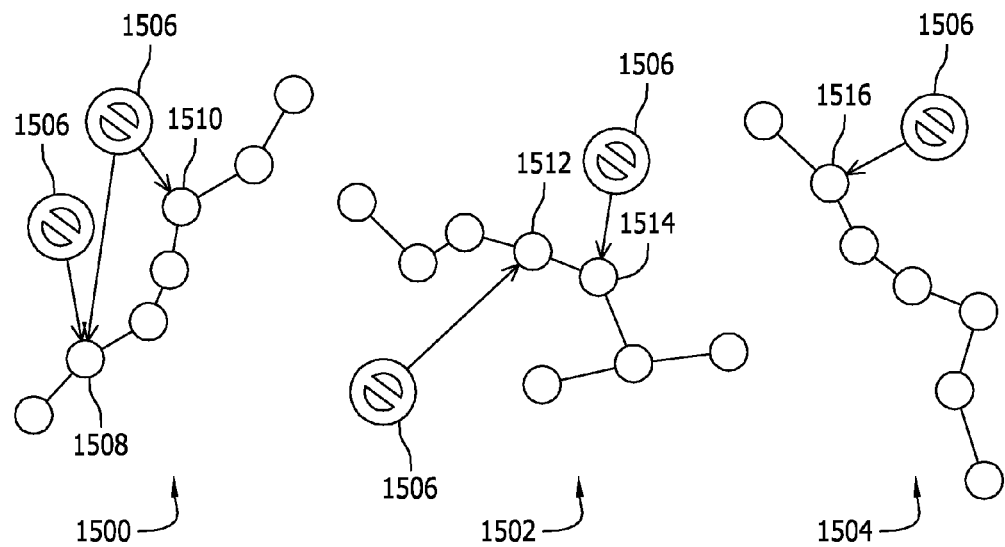
FIG. 15 is an illustration of three separate data flows.
Figure 16:
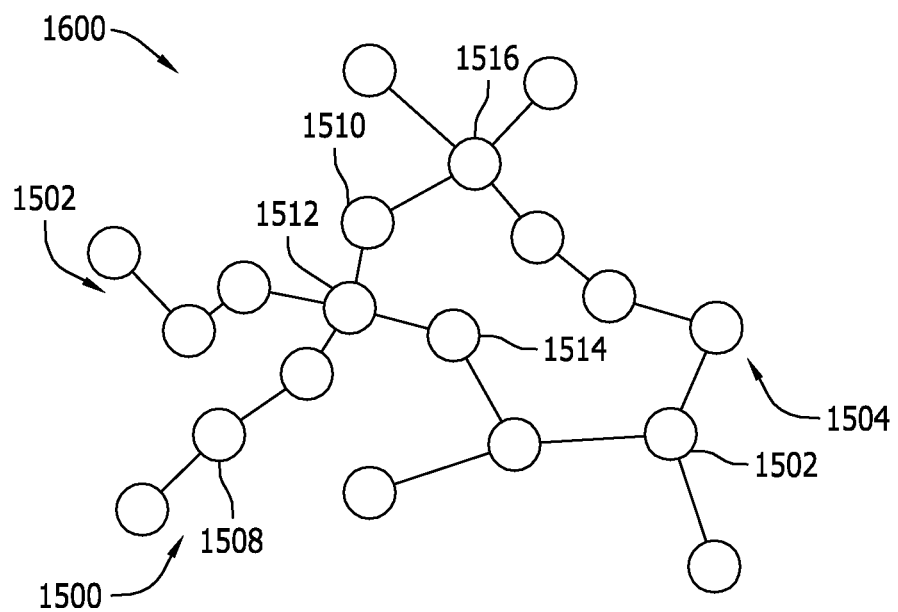
FIG. 16 is an illustration of the three data flows shown in FIG. 15 combined to form a network.
Figure 17:
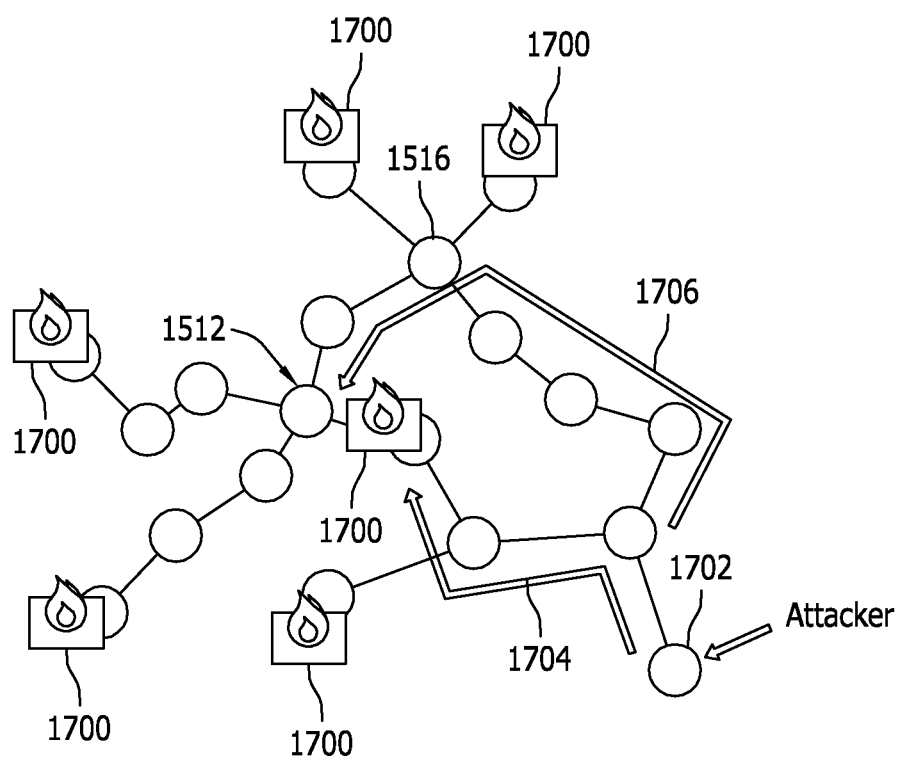
FIG. 17 is an illustration of the network shown in FIG. 16 with possible paths that may be followed by an attacker.

FIGS. 15-17 illustrate the combination of data flow slices of a network by one example system. FIG. 15 shows three network slices, or data flows, 1500, 1502, and 1504. The data flows 1500, 1502, and 1504 may be created by a single user or may be created by two or more different users. The data flow analysis for each of these flows 1500, 1502, and 1504 indicates several vulnerabilities (or findings) 1506 for particular network objects (or nodes) 1508-1516 of the data flows 1500, 1502, and 1504. In the overall network, the vulnerabilities 1506 of one data flow 1500, 1502, or 1504 will often impact one or more of the other data flows 1500, 1502, and 1504.

The example system allows the separate slices 1500, 1502, and 1504 to be combined and appropriately overlain as shown in FIGS. 16 and 17. In FIG. 16, data flows 1500, 1502, and 1504 are overlain and combined to form network 1600. Network 1600 may be an entire network or a portion of a network. It can be seen in FIG. 16, that slices 1500, 1502, and 1504 share several nodes. For example, slices 1500 and 1504 intersect at node 1516, while node 1512 is shared by slices 1500 and 1502. Slices 1502 and 1504 intersect at node 1602. When combined into network 1600 by the system, the intersecting nodes 1510, 1512, and 1602 accumulate all of the information, analysis, threat identification, etc. produced for that node in each of the slices 1500, 1502, and/or 1504 of which it is a part regardless of which user (or users) produced and/or analyzed each slice 1500, 1502, and 1504.

Moreover, the combined network 1600 may be analyzed as a whole in addition to analysis of individual slices 1500, 1502, and 1504. For example, in FIG. 17, network 1600 is analyzed to show potential routes that an attacker may take to reach, for example, node 1512. In this example, several of the nodes include firewalls 1700. Assuming the attacker enters network 1600 at node 1702, a first path 1704 to node 1512 is blocked by a firewall 1700. A second path 1706, however, may reach node 1512 without being blocked by a firewall 1700 or any other protection. Path 1706 traverses all three slices 1500, 1502, and 1504. Combining slices 1500, 1502, and 1504 into network 1600 permits comprehensive security assessment that may not be available when assessing individual slices 1500, 1502, and 1504.

Figure 18:
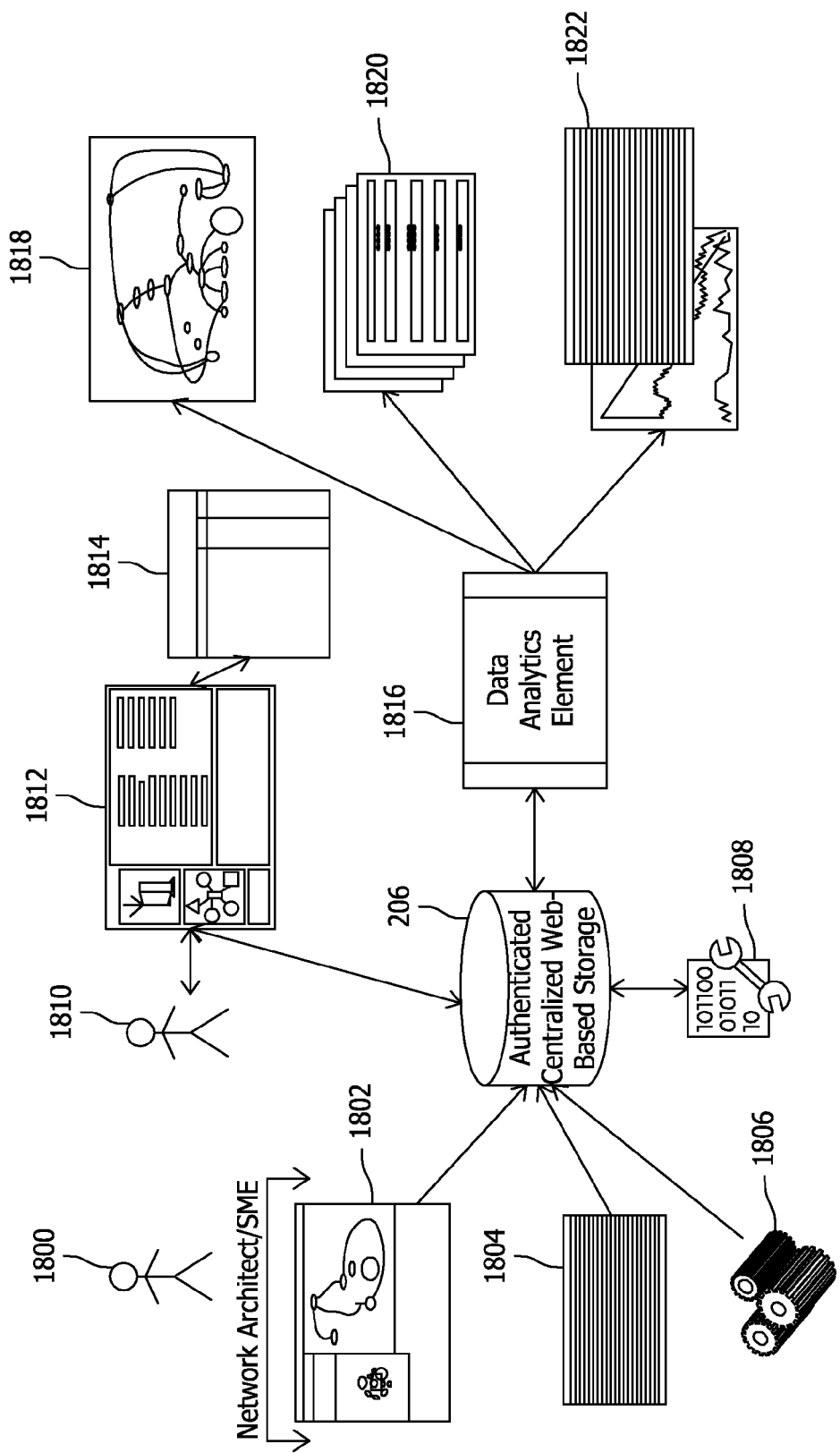
FIG. 18 is a functional block diagram of an exemplary system for architecture-centric threat modeling.

FIG. 18 is a functional diagram of the example implementation. All functions of the exemplary system are connected to the central database 206. The exemplary system provides several options for use by a network architect and/or SME user 1800 in network architecture design and mapping, including a graphical front end 1802, direct tabular input 1804, and import from other design and/or monitoring tools 1806. Security assessment configuration files 1808 can be uploaded to database. Tools for the security analyst 1810 include and detailed object profiles 1812 with continuous monitoring and security assessment checklists 1814. A data analytics element 1816 coupled to database 206 is configured to provide attack tree generation and visualization 1818, finding/vulnerability tracking and burndown management metrics 1820, and customizable executive and detailed reports 1822.

Figure 19:
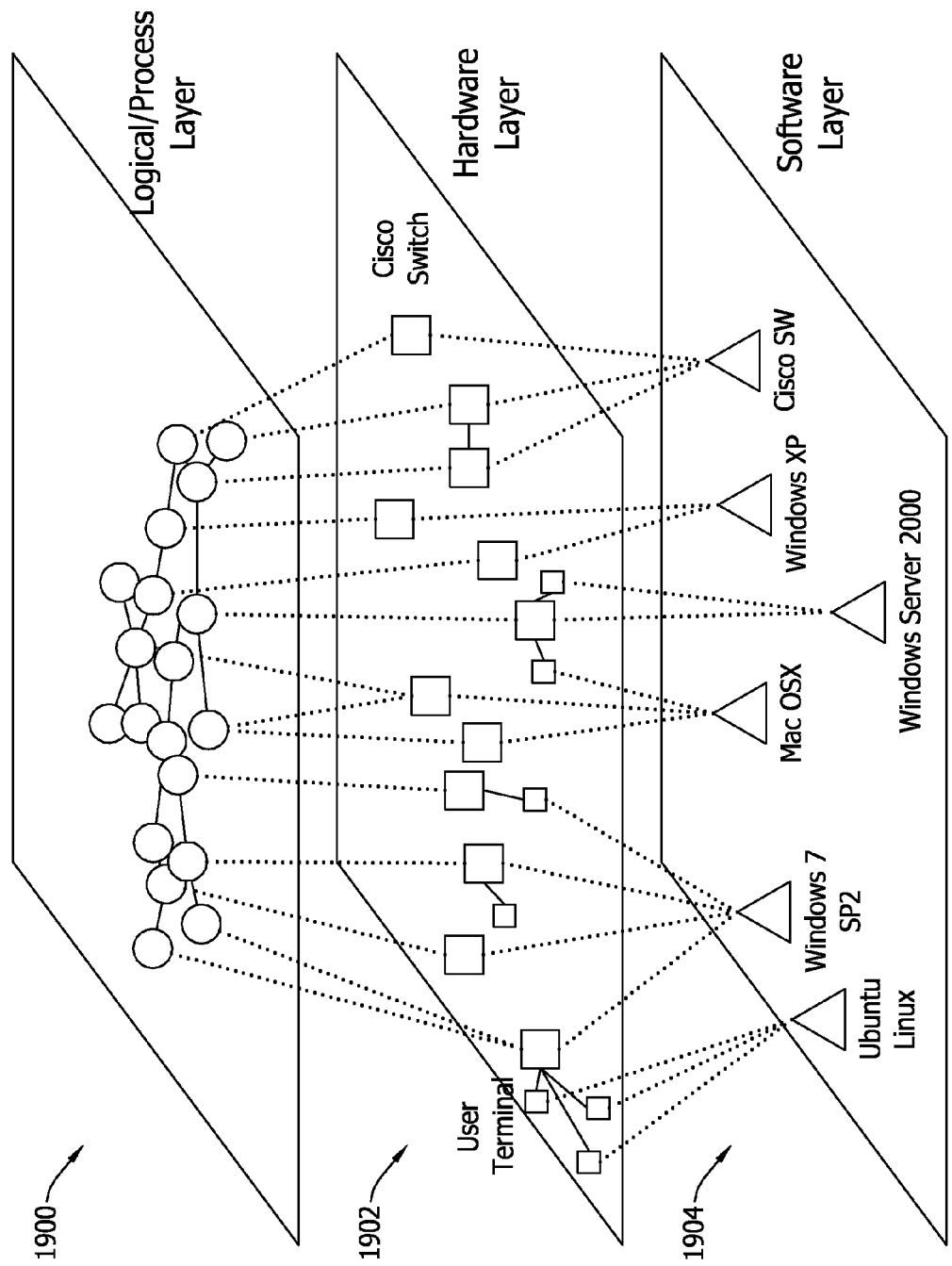
FIG. 19 is a diagram of multiple potential visualization layers of the system.

FIG. 19 is a diagram of multiple potential visualization layers of a network that may be displayed to a user by the system. The system gather the hierarchal information about each object, the multiple data flows, etc. generated as described above. In response to a user selection to view visualization layers, the system displays the information about the network as a series of interconnected layers. In the illustrated embodiment the system is displaying a logical/process layer 1900, a hardware layer 1902, and a software layer 1904. In other embodiments, more or fewer layers may be displayed and/or different layers may be displayed. The system allows the user to select all or part of these views to be seen simultaneously by the user. The user may also select to view any one of layers 1900, 1902, or 1904 individually.

Exemplary technical effects of the methods, systems, and apparatus described herein include at least one of (a) receiving a user selection of at least a first network object and a second network object from a plurality of network objects stored in a memory device; (b) creating a network architecture including the first network object and the second network object; (c) associating a plurality of attributes of the selected network objects stored in the memory device within the network architecture; (d) displaying a graphical representation of the created network architecture; (e) receiving at least one dataflow attribute associated with at least one of the first and second network objects; and (f) storing the at least one dataflow attribute to the memory device as an attribute of at least one of the plurality of network objects.

The methods and systems of the present disclosure provide a robust, efficient, architecture-centric system that may be used in network threat analysis. Various implementations provide central storage of all elements. A relational database stores critical information including data flows, links, objects, and findings. The database contains multiple objects with customizable object attributes based upon software, hardware, processes, etc. Object profiles can be created for use by every team member such that the involvement of subject matter experts (SMEs) is reduced. SMEs can also update those same profiles to keep all information up-to-date as appropriate. In various implementation, a finding is linked to an object or a link. The same finding may be applied to multiple objects across multiple systems. As findings are remediated, findings are updated and applied to all applicable data flows/systems automatically. The systems include the ability to create up-to-date data flow diagrams (DFDs) and threat trees. If a change is required to an object or finding, it can be modified in one place and applied to all relevant data flows without resorting to independently modifying a multitude of DFDs to reflect an identical change to different systems. In this manner, object security stances are made consistent from team member to team member. Moreover, the exemplary systems provide the ability to re-use current system objects to a new system greatly reducing work. Various implementations permit creation of "what if" scenarios, such as if a single object were compromised what other devices or systems may be compromised. The systems may also include linked threat trees across multiple systems/networks.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for use in network architecture threat modeling, said system comprising:
    a display device;
    a memory device for storing a plurality of attributes for each of a plurality of network objects and storing at least one network template including a plurality of selected network objects; and
    a processor communicatively coupled to said memory device, said processor programmed to:
        receive a user selection of at least one network template stored in said memory device that includes at least a first network object and a second network object from the plurality of network objects;
        create a first network architecture including and linking the first network object and the second network object;
        associate the stored plurality of attributes with the selected network objects in the first network architecture;
        display, on the display device, a graphical representation of the first network architecture;
        receive, from the user, at least one dataflow attribute of a dataflow that comprises a collection of links that defines a communication for completing a particular function using the first and second network objects;
        store the at least one dataflow attribute to said memory device as an attribute of at least one of the plurality of network objects;
        determine a second network architecture associated with at least one of the first network object and the second network object;
        generate a third network architecture combining the first network architecture and the second network architecture;
        determine a potential vulnerability path for the third network architecture based on the at least one dataflow attribute, wherein the potential vulnerability path represents a path through the third network architecture that an actor could take if the actor gained unauthorized access to the third network architecture; and
        display, on the display device, a graphical representation of the third network architecture and a graphical representation of the potential vulnerability path to enable a user to determine a potential fault.

2. A system in accordance with claim 1, wherein said processor is configured to store the first network architecture in said memory device as a network template in response to a user selection.

3. A system in accordance with claim 1, wherein the graphical representation of the created network architecture is a user selected one of a plurality of graphical representations.

4. A system in accordance with claim 3, wherein the plurality of graphical representations includes one or more graphical representations selected from a data flow diagram, an object hierarchy, an actor diagram by object, and an object only connection diagram, a threat tree, a hierarchical connection diagram, a physical diagram, and a logical connection diagram.

5. A system in accordance with claim 1, wherein said processor is further configured to receive, from the user, at least one threat finding associated with at least a portion of the first network architecture.

6. A system in accordance with claim 5, wherein said processor is further configured to store the threat finding associated with the portion of the first network architecture.

7. A method for use in network architecture threat modeling, said method comprising:
    receiving, by a computing device, a user selection of at least one network template stored in a memory device that includes at least a first network object and a second network object from a plurality of network objects stored in the memory device;
    creating, by the computing device, a first network architecture including the first network object and the second network object;
    associating, by the computing device, a plurality of attributes of the selected network objects stored in the memory device with the first network architecture;
    displaying, on a display device, a graphical representation of the first network architecture;
    receiving, from the user, at least one dataflow attribute of a data flow that comprises a collection of links that defines a communication for completing a particular function using the first and second network objects;
    storing the at least one dataflow attribute to the memory device as an attribute of at least one of the plurality of network objects;
    determining, by the computing device, a second network architecture associated with at least one of the first network object and the second network object;
    generating, by the computing device, a third network architecture combining the first network architecture and the second network architecture;
    determining, by the computing device, a potential vulnerability path for the third network architecture based on the at least one dataflow attribute, wherein the potential vulnerability path represents a path through the third network architecture that an actor could take if the actor gained unauthorized access to the third network architecture; and
    displaying, on the display device, a graphical representation of the third network architecture and a graphical representation of the potential vulnerability path to enable a user to determine a potential fault.

8. A method in accordance with claim 7, further comprising storing the first network architecture in the memory device as a network template.

9. A method in accordance with claim 7, wherein displaying, on a display device, a graphical representation of the created network architecture comprises displaying a user selected one of a plurality of graphical representations of the first network architecture.

10. A method in accordance with claim 9, wherein displaying a user selected one of a plurality of graphical representations comprises displaying a graphical representation of the first network architecture selected from a data flow diagram, an object hierarchy, an actor diagram by object, and an object only connection diagram, a threat tree, a hierarchical connection diagram, a physical diagram, and a logical connection diagram.

11. A method in accordance with claim 7, further comprising receiving at least one threat finding associated with at least a portion of the first network architecture.

12. A method in accordance with claim 11, further comprising storing, to the memory device, the threat finding associated with the portion of the first network architecture.

13. A non-transitory computer readable medium having embodied thereon computer executable instructions that, when executed by a processor, cause the processor to:
create a first network architecture in response to a user input, the first network architecture including at least one network template including a first network object and a second network object stored on a memory device;
associate a stored plurality of attributes with the selected first and second network objects;
display, on the display device, a graphical representation of the created network architecture;
store at least one dataflow attribute of a dataflow received from the user to the memory device as an attribute of at least one of the first and second network objects, wherein the dataflow comprises a collection of links that defines a communication for completing a particular function using the first and second network objects;
determine a second network architecture associated with at least one of the first network object and the second network object;
generate a third network architecture combining the first network architecture and the second network architecture;
determine a potential vulnerability path for the third network architecture based on the at least one dataflow attribute, wherein the potential vulnerability path represents a path through the third network architecture that an actor could take if the actor gained unauthorized access to the third network architecture; and
display, on the display device, a graphical representation of the third network architecture and a graphical representation of the potential vulnerability path to enable a user to determine a potential fault.

14. A non-transitory computer readable medium in accordance with claim 13, wherein said instructions, when executed by the processor, cause the processor to store the first network architecture in the memory device as a network template in response to a user selection.

15. A non-transitory computer readable medium in accordance with claim 13, wherein said instructions, when executed by the processor, cause the processor to create the first network architecture by retrieving a network template stored in the memory device.

16. A non-transitory computer readable medium in accordance with claim 13, wherein said instructions, when executed by the processor, cause the processor to receive, from the user, at least one threat finding associated with at least a portion of the first network architecture.

17. A non-transitory computer readable medium in accordance with claim 16, wherein said instructions, when executed by the processor, cause the processor to store to the memory device the threat finding associated with the portion of the first network architecture.

* * * * *